(12) United States Patent
Witherspoon

(10) Patent No.: US 6,477,303 B1
(45) Date of Patent: Nov. 5, 2002

(54) MEMS OPTICAL BACKPLANE INTERFACE

(75) Inventor: Barry K. Witherspoon, Blacksburg, VA (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 09/571,267

(22) Filed: May 15, 2000

(51) Int. Cl.[7] .................................................. G02B 6/26
(52) U.S. Cl. ............................. 385/52; 385/49; 385/35; 385/88; 385/74; 385/92
(58) Field of Search ............................. 385/52, 49, 35, 385/88–89, 73, 74, 92, 93

(56) References Cited

U.S. PATENT DOCUMENTS

| | | | |
|---|---|---|---|
| 5,179,609 A | 1/1993 | Blonder et al. ................ 385/89 |
| 5,257,332 A | 10/1993 | Pimpinella | |
| 5,259,054 A | 11/1993 | Benzoni et al. ................ 385/89 |
| 5,362,976 A | 11/1994 | Suzuki | |
| 5,550,088 A | 8/1996 | Dautartas et al. ............ 437/225 |
| 5,600,741 A | * 2/1997 | Hauer et al. .................... 385/35 |
| 5,647,044 A | 7/1997 | Basavanhally et al. ....... 385/92 |
| 5,781,331 A | 7/1998 | Carr et al. .................... 359/288 |
| 5,793,919 A | 8/1998 | Payne et al. | |
| 5,923,451 A | 7/1999 | Karstensen et al. | |
| 5,990,473 A | 11/1999 | Dickey et al. ......... 250/231.13 |

FOREIGN PATENT DOCUMENTS

| EP | 0611975 A1 | 2/1989 |
|---|---|---|
| EP | 0516337 A2 | 6/1992 |
| GB | 2322479 A | 10/1997 |

* cited by examiner

Primary Examiner—Cassandra Spyrou
Assistant Examiner—Fayez Assaf
(74) Attorney, Agent, or Firm—Lowe Hauptman Gilman & Berner, LLP

(57) ABSTRACT

An optical interface between circuit cards, more particularly between optical paths on a circuit card and a mainboard, is manufactured using bulk silicon micromachining technology. Silicon components of the interface are chemically etched and mass produced at a reduced cost for a higher degree of accuracy and precision than is available for mechanically produced interfaces. By use of micromachining technology to manufacture mating components of an interface, dimensional tolerances are possible which cannot be produced with conventional machining techniques. The resulting interface includes a pair of micromachined silicon substrates for mounting on a pair of circuit cards, each of the substrates having fiducial features, detents or cavities for aligning with the other substrate and thereby for aligning the two circuit cards. The optical path on a first circuit card may include an optical fiber mounted thereon. The silicon substrate mounted on a second circuit card includes a chemically etched cavity for a spherical lens, the cavity being aligned with the other fiducial features, detents or cavities etched therein, and thus being aligned with the optical path on the first circuit card. The interface further provides alignment pivots, which may be spherical lenses, within cavities micromachined in the substrates to implement self alignment of the substrates and hence of the circuit cards.

20 Claims, 1 Drawing Sheet

MEMS OPTICAL BACKPLANE INTERFACE

TECHNICAL FIELD

This invention relates generally to interfaces between main boards, or motherboards, and circuit cards mounted thereon and more specifically to self aligning optical interfaces for such connections. Still more particularly, the invention relates to a micro electromechanical system approach to forming such an interface, using bulk silicon micromachining technology.

BACKGROUND ART

Interfaces between circuit cards (or daughter boards) and main boards are known. Such interfaces typically provide frictional electro mechanical contacts for transfer of electrical signals between circuits on the two boards. With recent technological advances and miniaturization of circuit components, the amount of information which may be processed on a circuit card has increased significantly, thus increasing the bandwidth requirements for data transfer between two connected circuits.

Electromechanical interconnections of the types presently used in interfaces between circuits are limited in bandwidth, however.

Moreover, although optical interconnections are capable of increased bandwidth, such interconnections require significantly increased precision of alignment, and are expensive to manufacture.

In a separate field of endeavor, it is known to manufacture semiconductor chips by etching of silicon substrates. It is also known in the prior to use MEMS (micro electromechanical systems) technology to manufacture mechanical devices, machines, actuators and sensors. MEMS technology utilizes the known bulk silicon micromachining technology. This technology utilizes chemically etched silicon pieces, or substrates, which are typically produced from <100> high quality, low defect count silicon wafers. The wafers are in turn produced from single crystal silicon ingots containing controlled concentrations of dopants. Dopant levels and types should preferably be minimized to reduce dopant induced defects in the micromachined structures.

Such technology is described in U.S. Pat. No. 5,550,088 for producing self-aligned subassemblies on an optical bench. Therein, an active optoetelectronic device is mounted on a silicon base and, by using silicon based components including a variety of etched features such as grooves, cavities and alignment detents, is self aligned with a communicating optical fiber on the same silicon base. Thus, in the prior art there are provided optoelectronic devices which are self aligned with an optical fiber on an optical bench, whereby various self aligning steps are accomplished by using fiducial features formed in the silicon.

Additionally, U.S. Pat. Nos. 5,179,609 and 5,259,054 describe uses of etched silicon substrates for completely passive alignment of an active optical device and an associated optical fiber. In such an arrangement, separate silicon substrates form structural members such as a base and a header. Therein, one substrate supports the active optical device and one (or more) substrate(s) may have a groove for holding the associated optical fiber. Such configurations may utilize detents, cavities and spheres to align and mechanically attach the two substrates.

The prior art arrangements, however, apparently are only applicable to alignment of substrates, and particularly alignment of substrates which are assembled and aligned at the time of manufacture.

Moreover, the arrangements of the prior art provide optoelectronic devices, i.e., active circuits, on micromachined silicon substrates which are aligned with each other to form a single optical device.

The prior art thus fails to provide a passive interface between two circuit devices which include electrical circuits as well as optical paths, fails to provide alignment between two optical paths of separate devices, fails to provide an optical interface between commercial devices from different manufacturers, and fails to provide an optical interface between two different circuit boards, in which the interface includes two separate passive silicon substrates mounted on the two separate circuit boards. Still more particularly, the prior art fails to provide a circuit board, which has a micromachined silicon interface component attached thereto, and which thus may be self aligned with another similarly equipped circuit board.

Additionally, the prior art fails to disclose a method for connecting a first circuit board to another circuit board which includes a step of attaching to the first circuit board a chemically etched silicon substrate having fiducial features therein. Nor does the prior art provide a method for connecting circuit boards which provides for attaching micromachined silicon substrates to each of the circuit boards, each silicon substrate having fiducial features etched therein, and by mating the two substrates to each other in a self aligning fashion. The prior art also fails to disclose a method for connecting circuit boards each having passive silicon chips mounted thereon, the chips having fiducial features etched therein, which includes a step of providing ball lenses between fiducial features of the two chips to obtain a self aligning mating of the circuit boards.

DISCLOSURE OF INVENTION

It is accordingly an object of the present invention to overcome the deficiencies of the prior art.

More specifically, it is an object of the invention to provide an improved method for forming an optical interface between a circuit card and the mainboard on which the circuit card is mounted.

It is a particular object of the invention to provide an improved method for providing a self aligning optical interface between a circuit card and a mainboard.

It is yet another object of the invention to provide a method for forming between two circuit boards a passive optical interface which utilizes micro electromechanical technology.

It is a more specific object of the invention to provide an improved optical interface between a circuit card and the mainboard on which the circuit card is mounted.

It is still a more particular object of the invention to provide an improved self aligning optical interface between a circuit card and a mainboard.

It is yet another object of the invention to provide a passive, micromachined self aligning optical interface between separate circuit devices.

It is still a further object of the invention to provide a self aligning optical interface between separate circuit devices, which includes on each of the circuit devices a silicon substrate, each substrate having at least one chemically etched aligning feature, and each having a chemically etched aligning feature for an optical fiber.

It is yet another object of the invention to provide a self aligning optical interface between separate circuit devices, which includes on each of the circuit devices a silicon substrate, each substrate having at least one chemically etched aligning feature and each having a chemically etched aligning feature for an optical fiber, and each including a ball lens.

It is still another object of the invention to provide a self aligning optical interface between separate circuit devices, which includes on each of the circuit devices a silicon substrate having at least one chemically etched aligning feature and a chemically etched aligning feature for an optical fiber, each including a ball lens, and at least one of the substrates on one of the circuit devices having a reflecting surface for changing the direction of light traveling through the optical fiber thereof.

Still another object of the invention is to provide a self aligning optical interface for aligning separate matching circuit devices, which includes on each circuit device a silicon substrate, the substrate of each circuit device having at least one chemically etched aligning cavity for matching with a corresponding chemically etched aligning cavity of the substrate of another circuit device, the cavity formed by the matched aligning cavities dimensioned for holding therein a spherical lens to align the matched devices.

It is yet another object of the invention to provide a self aligning optical interface for aligning separate matching circuit devices, which includes on each circuit device a silicon substrate, the substrate of each circuit device having at least one chemically etched aligning cavity for matching with a corresponding chemically etched aligning cavity of the substrate of another circuit device, the cavity formed by the matched aligning cavities dimensioned for holding therein a spherical lens to align the matched devices, and further including an aligning feature for aligning thereon a spherical lens for light traveling through an optical fiber associated with the circuit device, whether on the substrate or on the circuit device.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWING

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

Figure 1:
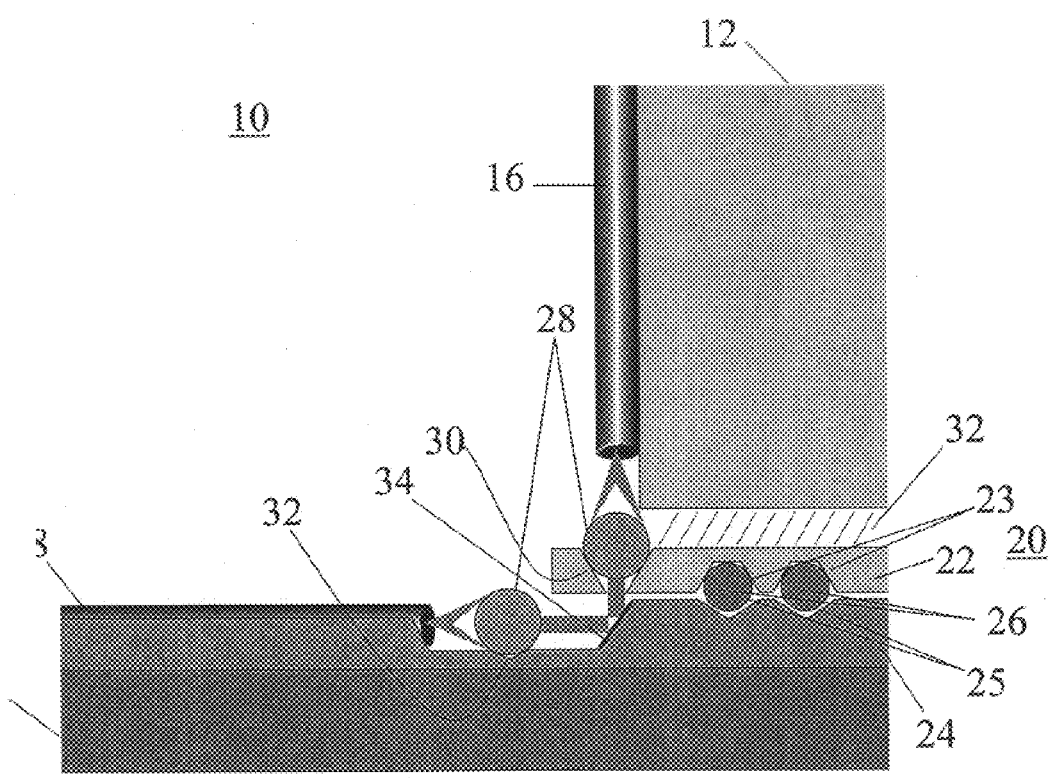
FIG. 1 is a diagram depicting an interface in accordance with the invention as used with two circuit cards.

As hereinabove described, the present invention recognizes the MEMS technology is useful in forming interfaces between two circuit cards. More particularly, by utilizing the fact that silicon etches at different rates along its crystalline planes, the invention provides for mass production of structures such as V-grooves, mirrors and four sided pyramidal pockets with a high degree of accuracy and precision, using technology known in the art of semiconductor chip production and silicon micromachining. As is known in the art of semiconductor chip manufacture, large numbers of components manufactured with this technology can be produced on a single wafer.

Thus, the invention provides mass production at relatively low cost of parts with tighter tolerances than can be mass produced, or that can be produced at all, with conventional machining techniques.

As will be appreciated from the following description of the invention, the interface subassembly components include two chemically etched silicon substrates, or optical benches, on which are formed (e.g., by known etching techniques) specific structures such as pockets, cavities, detents or channels, and other structures useful for the purposes provided herein. Inasmuch as the present invention provides an interface for conveying optical information from an optical fiber (or optical waveguide) on one circuit board to another, it should be appreciated that an optical fiber is associated with at least one of the circuit cards. In accordance with a feature of the invention, spherical lenses (or ball lenses) are formed using silicon micromachining technology for example, and are used in an optical path to convey optical information from one circuit (or circuit board, or circuit card) to another. The same spherical lenses, or other pivot elements, are formed for use with the pockets etched into the silicon substrates to provide a self-aligning interface.

Indeed, since the V-grooves can be almost perfectly aligned with the cavities containing the lenses, precise alignment of the optical waveguide or fiber with the lenses can be easily achieved. Advantageously, the precise alignment attainable by the invention allows for losses less than 1 dB.

Additional loss reductions can be achieved by applying antireflection coatings to the lenses or waveguide faces.

Referring now to the drawings, in FIG. 1 there is shown an arrangement wherein two circuit cards are brought into electrical and optical communication by an interface in accordance with the invention.

In accordance with the presently preferred embodiment of the invention, the configuration of FIG. 1 provides communication between a daughter board (or any circuit card or the like) 12 and a motherboard, backplane or any other circuit card 14.

Electrical interconnection between the two circuit cards may be carried out with the aid of frictional interfaces as known in the art. Alternatively, it is possible to provide for non-frictional electrical contact between the two cards, in view of the self aligning nature of the inventive interface and the fact that inasmuch as the interface provides the alignment, it is not necessary to rely on frictional contact, adhesive, soldered or any other type of electrical contact for alignment.

As shown in FIG. 1, daughter board 12 includes an optical fiber (or waveguide) 16 associated therewith, and motherboard 14 similarly includes an optical fiber 18 associated therewith.

Fiber 16 is shown as being mounted on circuit card 12, and may be attached to the card in any known fashion. Thus, whether the circuit card 12 includes an active optoelectronic device or other light processing component thereon, the light generated or processed thereon is communicated via fiber 16 to the circuit card 14 interfacing with card 12. One manner of associating an optical fiber with a circuit card is illustrated by the illustrated arrangement for fiber 18, which is mounted within a retaining or guiding structure such as a channel, formed in the portion of the interface mounted on the motherboard (or other circuit card interfacing with circuit card 12). It should thus be recognized that a fiber associated with a circuit card may be mounted on the card or may be mounted on a portion of the interface.

Additionally, though not shown in the drawing FIGURE, different forms of association may be provided. For example, while one fiber may be mounted on the daughter board in the manner of fiber 16, the other fiber (or other light path) may be associated with a device which is separate from both the daughter board and the motherboard. Thus, a light path from an external device may convey information to one of the two cards, the information being processed on the card and then being communicated to the other of the two cards. Thus, the first card may have a fiber (or other light path) aligned with the external device and may have only electrical contacts with the second device.

Accordingly, while alignment of light paths is an advantageous result of the invention, the inventive interface may be used for aligning any combination of electrical connections, physical connections, light connections, or any other connections, between two circuit cards, and may or may not include an optical fiber associated therewith.

As seen in FIG. 1, a self-aligning interface 20 embodies the invention. The interface provides for signal communication between the two circuit cards 12 and 14, as described with respect to the optical fibers or waveguides 16 and 18. Moreover, interface 20 aligns the two cards relative to each other to permit other forms of communication, such as electrical or other communication, to take place between the components of the two cards.

Interface 20 includes a first portion 22 affixed to the first circuit card 12 and a second portion 24. First portion 22 is shown as a micromachined silicon substrate or optical bench. Similarly, second portion 24 is a micromachined substrate (e.g., an optical bench) affixed to the second circuit card 14. The two substrates include various fiducial features for aligning with one another. In the preferred arrangement shown in FIG. 1, one of the two substrates may include a number of pyramidal pockets 23 and the other a number of V-shaped grooves 25. It should be appreciated that either substrate may have either the pockets, the grooves, or a combination of the two. Further, though not shown in the illustration of FIG. 1, other features may be included on a substrate forming a portion of the interface. For example, various detents, cavities, protrusions, channels or other structural features may be micromachined or etched in the silicon, to provide various mating or aligning functions with another portion of the interface or to retain separate aligning devices, such as alignment pivots 26 shown in FIG. 1.

Because of the inexpensive nature of the micromachining process, in the preferred embodiment alignment pivots 26 are spherical lenses, which are quickly, inexpensively and efficiently produced with the interface portions. Pivots 26 may be cylindrical lenses, or other structures, which are shaped to maintain pockets 23 and grooves 25 of first and second portions 22 and 24 in alignment.

Thus, the spherical lenses 26 are formed in a manner known in the art. As shown in the preferred embodiment of FIG. 1, the lenses are retained between pockets 23 and grooves 25 of first and second portions 22 and 24 of interface 20. In FIG. 1, spherical lenses 26 do not perform an optical function, but merely a self-aligning function, retaining the two portions 22 and 24 at a predetermined alignment relative to each other, as established by the positioning of pockets 23 and grooves 25. Of course, in some configurations, it is likely that spherical lenses 26 would, indeed, be used as lenses in particular optical paths.

In the preferred embodiment, there are provided two spherical lenses 28, respectively at the output end of one optical path (such as fiber 18 of circuit card 14) and the input end of the other optical path (optical fiber 16 of circuit card 12).

The lenses 28 in each of the optical benches act to capture and collimate the light emanating from one fiber or waveguide, to focus it across the gap, and further to focus the light onto the second fiber or waveguide. The lens materials are selected to maximize optical power transmission at specific wavelengths and to improve ease of manufacture.

As shown in FIG. 1, a spherical lens 28 may be retained in a pocket 30 formed in one of the optical benches. The pocket 30 may have a large (upper) opening for capturing the lens and one (or more) smaller light openings for passage of light being refracted by the lens. The light openings are smaller than the lens capturing opening to assure that the lens is retained in the pocket. In FIG. 1, light is transmitted towards fiber 16 through the small opening at the bottom of pocket 30, and after refraction by lens 28, is passed to the fiber 16 for processing by components situated on the daughter board (or elsewhere). Alternatively, rather than having plural openings in a side of a pocket, a lens may be situated on the appropriate optical bench, as illustrated with respect to lens 28 associated with the motherboard 14. As shown in FIG. 1, light emanating from fiber 18 passes through a lens 28 situated on (and substantially externally to) a small indentation 32. It should be appreciated that light may travel either from fiber 16 to fiber 18, or vice versa, without departing from the inventive concept.

It is also contemplated that the two light paths on the two circuit cards interfaced by the inventive interface will not necessarily be in a straight line. Accordingly, one (or both) interface portions may include a mirror portion. In the preferred embodiment of FIG. 1, a gold coated 45° mirror surface 34 is formed on second portion 24 of the interface, to mirror the light communicated between the mother and daughter boards.

Mirror 34, which turns light at a right angle from the motherboard to the daughter boards or vice versa, is also produced by silicon micromachining. The mirrored surface results from the slow etch rate of the <111> crystalline plane of the silicon, and is subsequently coated with titanium, platinum and gold to increase the mirror reflectivity to better than 97%. Along with V-grooves 25, lens pockets 23 and 30 and indentation 32, as well as other alignment features, the mirror 34 is produced in a single etching operation. Custom prepared wafers can also be used to improve the mirror efficiency by optimizing the mirror angle at forty-five degrees.

Precision alignment of the optical components is a key to producing a low loss interface. As discussed above, such optical alignment is readily achieved utilizing silicon micromachining. However, it is also important to have precision mechanical alignment of the two silicon mating optical benches. This mechanical alignment can be achieved in a number of ways. However, the same types of etched features that allow for good optical alignment can also be utilized for precision mechanical alignment.

Thus, as will be appreciated from the foregoing description, in accordance with the present invention a self aligning interface is produced by etching separate, precisely located and aligned, fiducial features including detents, channels, pyramidal pockets and/or grooves in each mating silicon piece. Ball lenses are then installed in two or more of the alignment pockets. The interface is assembled by mating together the two optical benches. When the optical benches are mated together, the lenses installed in the pockets of the first piece seat in the mating pockets (or grooves) of the second piece, thus mechanically and optically aligning the two pieces.

Rubber bumpers located on both sides of on of the pieces cushion the two pieces as they are mated together and compensate for any misalignment of the connector housing. One such bumper is shown at 32, as providing cushioning between silicon portion 22 and the circuit card 12. Standard mounting screws (or other well known hardware) may used to fully seat and hold the two structures together.

It should thus be appreciated that the present invention utilizes MEMS and bulk silicon micromachining technology to create an interface, preferably an optical interface, between a mother board and a daughter board on a printed circuit board/optical backplane for example. A silicon micromachined optical bench is interfaced to optical waveguides or fibers located on or within the optical backplane board. The optical signal is captured, focused and reflected perpendicularly out of the backplane board, through a series of ball lenses and micromachined mirrors, into another optical waveguide fiber or active device located on the mating daughter card, which is equipped with a mating MEMS based optical interface portion.

It should be further appreciated that the inventive concept may be integrated into a standard electrical backplane connecter, or may be used as a free-space optical coupling device. Mechanical alignment of the optical interface to within ±1 micron is achieved by the use of micromachined pivots and flexible mating structures in the mother and daughter boards.

Signals may be transferred between the mother board and one or a plurality of daughter boards.

To the extent necessary for understanding known techniques of micromachining, the disclosures of any patents referenced herein are incorporated herein by reference.

The foregoing description of the preferred embodiment of the invention has been presented for purposes of illustration and description. It is not intended to be exhaustive or to limit the invention to the precise forms disclosed, since many modifications or variations thereof are possible in light of the above teaching. For example, different optical or mechanical configurations may be used without departing from the inventive concept. Moreover, although spherical lenses are shown as the alignment pivots, other structures may be used instead, to provide mechanical mating between structural features of the mating optical benches. Another example of a modification to the above description of the invention pertains to the form of the pockets or grooves. It should be appreciated that any form of mechanically corresponding features may be used, and that the grooves and pockets are merely illustrative of the inventive concept.

The foregoing and other such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

I claim:

1. A self aligning interface for interfacing separate circuit devices, comprising:
   a first circuit device;
   a first silicon substrate mounted on said first circuit device;
   said first silicon substrate having:
      at least one chemically etched aligning feature thereon;
      a second chemically etched aligning feature for aligning an optical fiber to the first silicon substrate,
   a second circuit device;
   a second silicon substrate mounted on said second circuit device;
   said second silicon substrate having:
      at least one chemically etched aligning feature thereon for aligning said second silicon substrate with said first silicon substrate; and
      whereby said first and second silicon substrates matingly engage each other in self aligning manner, thereby providing self aligning mating of said first and second circuit devices.

2. The self aligning interface recited in claim 1, wherein said circuit device comprises a circuit card and said silicon substrate is mounted on an edge of said circuit card.

3. The self aligning interface recited in claim 1, wherein said second silicon substrate further has a second chemically etched aligning feature for aligning an optical fiber to the silicon substrate.

4. The self aligning interface recited in claim 1, wherein:
   said first and second circuit devices each comprises a circuit card and said first and second silicon substrates are respectively mounted on said first and second circuit cards to provide said self aligning interfacing therebetween.

5. The self aligning interface recited in claim 4, further comprising:
   a first optical fiber on said first silicon substrate and aligned thereto by said second chemically etched aligning feature of said first silicon substrate, and
   a second optical fiber on said second silicon substrate.

6. The self aligning interface recited in claim 5, wherein: said second silicon substrate further has a second chemically etched aligning feature for aligning said second optical fiber to said second silicon substrate.

7. The self aligning interface recited in claim 6, wherein:
   said first chemically etched aligning features of said first and second silicon substrates are configured for retaining a ball lens therebetween; and
   further comprising at least one ball lens between said first chemically etched aligning features of said first and second silicon substrates;
   said at least one ball lens aligning said first chemically etched aligning features of said first and second silicon substrates and thereby aligning said first and second silicon substrates relative to each other, aligning said first and second circuit cards relative to each other, and aligning said first and second optical fibers relative to each other to define a single light path through said first and second optical fibers.

8. The self aligning interface recited in claim 7, wherein at least one of said first and second substrates comprises has a reflecting surface thereon for changing the direction of light traveling through said single optical light path.

9. A self aligning interface for interfacing separate circuit devices, comprising:
   first and second circuit devices;
   first and second silicon substrates mounted on said first and second circuit devices, respectively;
   each of said first and second silicon substrates having at least one chemically etched aligning cavity,
   said chemically etched aligning cavities of said first and second silicon substrates respectively corresponding to and matching with each other;
   a combined cavity formed by the matched aligning cavities dimensioned for holding therein a spherical lens to align the matched aligning cavities relative to each other, thereby aligning said first and second silicon substrates relative to each other and aligning said first and second circuit cards relative to each other.

10. The self aligning interface recited in claim 9, wherein at least one of said first and second silicon substrates comprises an aligning feature for aligning a spherical lens to said at least one silicon substrate for refracting light traveling through an optical fiber associated with the circuit device to which said at least one silicon substrate is mounted.

11. A self aligning interface portion for interfacing a motherboard to a daughter board, comprising:
   a mother board, and
   an optical bench mounted on said mother board;
   said optical bench having at least one chemically etched aligning cavity thereon;
   said aligning cavity dimensioned for holding therein an alignment pivot to align the optical bench with a corresponding optical bench of a daughter board.

12. The self aligning interface recited in claim 11, wherein said optical bench mounted on said mother board further comprises a retaining means for retaining an optical fiber thereon.

13. The self aligning interface recited in claim 12, wherein said optical bench mounted on said mother board further comprises a lens mounted thereon for refracting light passing through said optical fiber.

14. The self aligning interface recited in claim 13, wherein said optical bench mounted on said mother board further comprises an indentation formed therein for retaining said lens.

15. The self aligning interface recited in claim 13, wherein said optical bench mounted on said mother board further comprises a mirrored surface formed thereon for changing a direction of light passing through said optical fiber.

16. The self aligning interface recited in claim 15, wherein said alignment pivot comprises a spherical lens.

17. The self aligning interface recited in claim 12, wherein said optical bench mounted on said mother board further comprises a mirrored surface formed thereon for changing a direction of light passing through said optical fiber.

18. The self aligning interface recited in claim 11, wherein said alignment pivot comprises a spherical lens.

19. A method for aligning a first circuit card mounted to a first silicon substrate having first cavities chemically etched therein to a second circuit card mounted to a second silicon substrate having second cavities in positions corresponding to said first cavities, comprising steps of:
   providing alignment pivots for placement between said corresponding first and second cavities;
   positioning said first aligning cavities of said first silicon substrate adjacent to the corresponding second cavities of said second silicon substrate corresponding thereto so as to position and retain said alignment pivots therebetween;
   thereby aligning said first and second silicon substrates to each other and thereby aligning said first and second circuit cards to each other;
   wherein at least one of said first and second circuit cards has an optical fiber associated therewith, and wherein one of said first and second silicon substrates mounted on the other of said first and second circuit cards has a chemically etched cavity therein in alignment with said aligning cavities chemically etched therein, comprising the further step of:
   providing a spherical lens in said chemically etched cavity of said one of said first and second silicon substrates mounted on the other of said first and second circuit cards; whereby said optical fiber associated with said at least one of said first and second circuit cards is aligned with said spherical lens for refracting light passing through said optical fiber.

20. The aligning method recited in claim 19, wherein each of said first and second circuit cards has an optical fiber associated therewith, and wherein said step of positioning said first aligning cavities of said first silicon substrate adjacent to the corresponding second cavities of said second silicon substrate corresponding thereto comprises aligning said optical fibers of said first and second circuit cards.

* * * * *